Oct. 3, 1961 M. P. LAUGHLIN 3,002,319
HAND WEED DESTROYER
Filed April 5, 1956
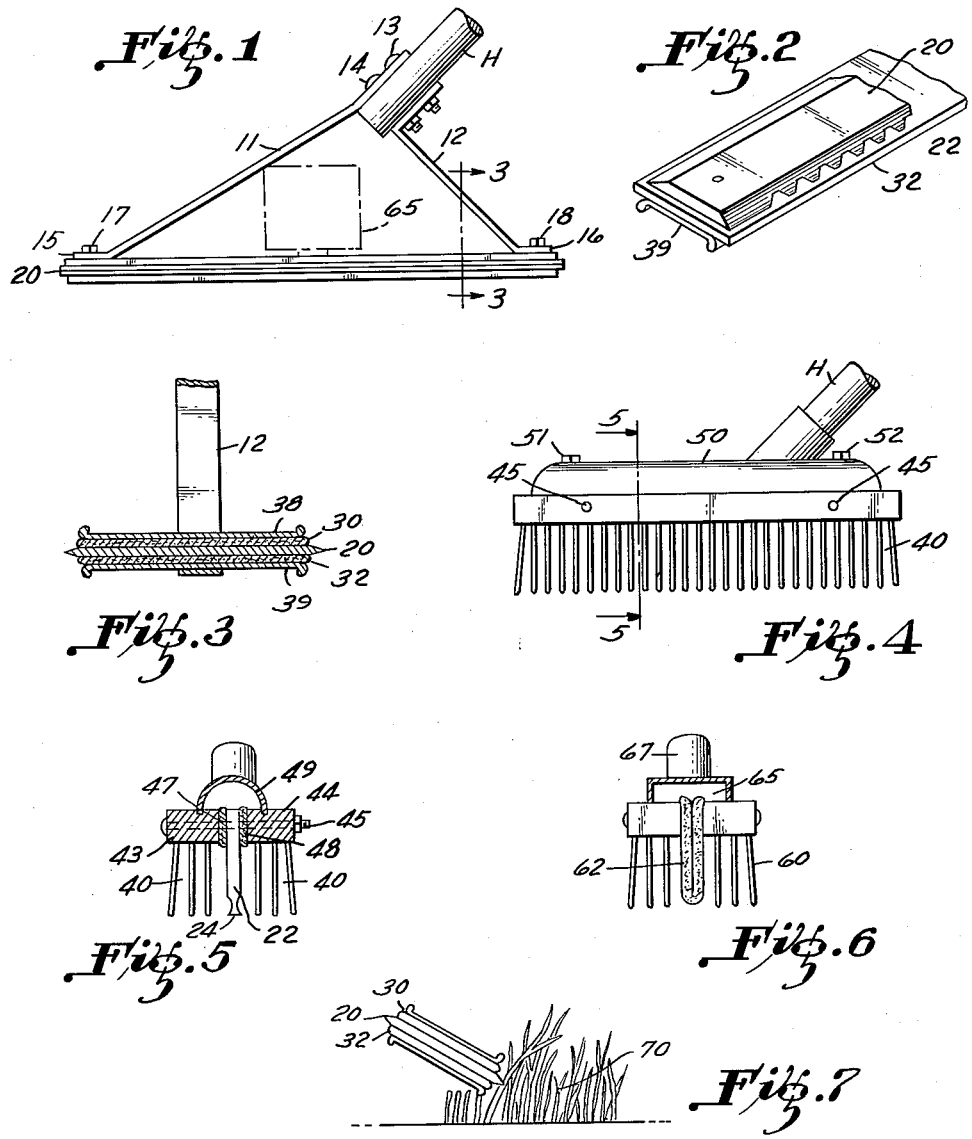
INVENTOR
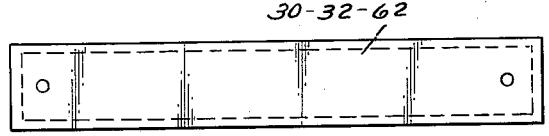

United States Patent Office 3,002,319
Patented Oct. 3, 1961

---

3,002,319
HAND WEED DESTROYER
Myron P. Laughlin, St. Petersburg, Fla.
Filed Apr. 5, 1956, Ser. No. 576,318
4 Claims. (Cl. 47—57.5)

This invention relates to land clearing and improving devices, and more especially to hand tools for the elimination of grass and crop weeds. The use of hand cutters of the "grass whip" type to clear brush and weeds is will known, and such tools have been simplified and made effective by development lasting over many years. The herein disclosed invention provides simple means adding substantially to the functions of such devices without appreciable increase in structure or cost.

It is a primary purpose of this invention to provide a tool which not only cuts weeds and undesirable plants, but simultaneously applies poison to destroy the stalk and root of the same.

In clearing lots and the like of brush and weeds preparatory to setting out lawns and other desired vegetation, it has been the practice to use cutters of the type locally termed "whips" to "knock down" the brush and weeds, then to burn over or root out the remainder. Burning often did not destroy root systems and was attended by substantial property hazard, leading to prohibiting ordinances in many areas. Rooting out by hoeing or plowing out involved high clearing and labor cost. It is a particular purpose of this invention to provide a cutter of the grass whip type which simultaneously "knocks down" and applies a growth control or sterilizing material to the abraded vegetation, thus assuring complete destruction of the growth to be eliminated, preventing regrowth, and encouraging desired growth over the area.

It is a further purpose of this invention to provide simple apparatus by which a property owner can clear the weeds from his lawn or other crop without damage thereto while cutting his grass, and without the added labor heretofore involved in spot-weeding by cutters, diggers, poison canes and the like.

Another purpose of this invention is to provide renewable and replaceable means for supplying one or more chemicals so that physical contact by the user is never required.

It is also a purpose of this invention to provide, through the appended disclosures or equivalent means, a simple inexpensive hand device for lawn building through the direct application of modern selective chemicals.

Referring to the attached drawings:

FIG. 1 shows a grass whip type cutter having my improvements incorporated therein.

FIG. 2 is an enlarged view of a fragmentary portion of the device shown in FIG. 1.

FIG. 3 is an enlarged cross section on line 3—3 of the cutter bar of the device shown in FIG. 1 with certain modifications from the portion shown in FIG. 2.

FIG. 4 is a side elevation of a modified form of abrading device incorporating my invention.

FIG. 5 is a partial section on line 5—5 of the device shown in FIG. 4.

FIG. 6 shows a further modification of the device shown in FIGS. 4 and 5, partial section being taken in similar fashion to FIG. 5 cross-sectioning of the brush block being omitted for purposes of clarity. It is taken in cross-section.

FIG. 7 shows the cutter of the device shown in FIG. 3 in operation.

FIG. 8 shows a packaged applicator forming one of the parts.

Referring particularly to FIGS. 1, 2 and 3, H represents a common type handle for hand manipulated garden tool devices, the upper end thereof being cut off for space reasons. Attached to such handle H are braces 11 and 12 secured thereto by bolts 13 and 14. Braces 11 and 12 at their lower ends have extensions 15 and 16 through which bolts 17 and 18 join them to the cutter bar 20. Cutter bar 20 may be straight, as shown in the drawing, or follow any of the configurations well known to those skilled in the art for such cutters. It may have a straight cutting edge 21, or be serrated, as indicated at 22, all within the knowledge of such prior structures. My invention lies not in such cutter bars, but in supplementing such abraders by feeding devices such as the replaceable chemical containers, such as pads 30 and 32 through which are fed chemicals in fluid or solid form so that as the vegetation is abraded, such applicators rub the agricultural chemicals upon the plant surface at and adjacent to the abrasion produced by the cutter. Reservoir 65 for the chemicals is provided. Thus, the plant, leaves and stalks have the agricultural chemical literally injected into sap and fibre without further labor or apparatus and costly sprayers and applicators become unnecessary while chemical effectiveness is many times increased. The actual operation of the device may be seen in FIG. 7 wherein the vegetation 70 is being knocked down by cutter 20 while wiper pad applicators 30 and 32 apply a plant chemical.

It is preferable to provide guard members 38 and 39 as shown in FIG. 2 above and below applicators 30 and 32 to support, guide and protect the same and an optional tank R which may feed added chemical through suitable ducts as the device is used over considerable periods. However, it will be understood that where limited use is in prospect certain of these parts may be eliminated without destroying the immediate effectiveness of this invention and that a preimpregnated single pad-like applicator may be used, as shown in FIG. 2 either above or below the cutter bar 20.

Referring now in particular to FIGS. 4 and 5, it will be clear that actual cutting off of the vegetation to be destroyed is no longer necessary and that so long as the vegetation is knocked down and abraded (see FIG. 7) major purposes of this invention will be accomplished. Thus in FIGS. 4 and 5, a brush (preferably of the wire bristle type) supplements a vertical blade 22 (preferably sharpened at edges 24 at its lower end) so arranged that a certain amount of cutting will supplement the action of bristles 40. Bristles 40 may be mounted in blocks 43 and 44 and the whole secured together by such means as bolts 45 which also hold open channeled feeder strips 47 and 48 communicating with the storage space 49 within the cover and handle attachment element 50. Element 50 is secured to the previously described structure by bolts 51 and 52. In the modification, last described, the chemicals are stored within the reservoir element 50 and fed through feeders 47 and 48 here shown as of the wick type upon either side of cutter 22 and contact the vegetation as the device is swung after the fashion of the usual grass whip. Bristles 40 protect the blade 24 from the ground, as did the guard 39 in the previous modification.

The modification shown in FIG. 6 will serve to show that by the provisions of heavy sharp metal bristle brushes 60 use of the cutter blade may be dispensed with without losing my major advantages since such bristles abrade the vegetation and permit the wiper feeder 62 to inject a chemical with great effectiveness. Feeder 62 is preferably fed from a reservoir 65 held within the handle or its extension 67 as indicated. In this modification the handle is held in extension 67 rather than through braces 11 and 12 as in FIG. 1.

The devices above have been particularly shown as best adapted to fluid chemicals, but it will be understood that they are equally applicable to dry additives within the slight modifications well known to those skilled in the art and that mere changes in size and type of feeder ducts and means for such purposes have simply been avoided here for brevity of description.

It will also be understood that while for purposes of disclosure of means, plant destroyers have been mainly discussed. The means disclosed are also applicable to the feeding of fertilizers and growth promoters and that in certain instances one of applicator feeders may feed a powder while the other feeds a liquid component, and that one such applicator may feed a chemical suited to broad leaf plant destruction, such as 2–4 D (2-methyl-4-dichlorophenoxyacetic acid) while the other feeds a 2–5 T (trichlorophenoxyacetic acid) chemical and that such applicators may be readily removed and/or substituted by the user as and when required, preferably being sold in sealed packages 80 (see FIG. 8) so that the chemicals retain full potency, while the user is protected from any side results in handling or storage. Packages 80 are preferably of breakable material such as paper or plastic so as to be opened when the plant is struck as operation begins or destroyed when liquids such as water or oils are added by contacting the package surface therewith.

It will be understood that in operation, the cutter is swung by the user's hand as is common with such devices and that while the cutting of brush and the like during the clearing of lots has been referred to, the tool may be used on grassed plots to simultaneously trim narrow-bladed grasses without damage thereto, so that the broad-leaf weeds will not only be cut, but effectively destroyed, root, stalk and branch without added labor or further application. It will be obvious that many other modifications in construction, embodiments of means, application and operation are possible, well within the spirit of my invention and the scope of the appended claims.

I claim:

1. In a plant growth control chemical applicator for group plantings, a plant surface abrader-applicator means in combination with a support carrier therefor, said plant surface abrader including a plant scarifier and a cooperating chemical applicator operating together to vaccinate and inoculate the plant surface above the root growths thereof and said carrier including support means extending to the plant growth area surface to fix the spacing of the abrader carried thereby relative to the plant growth from said surface.

2. A weed and grass plant breaker and chemical applicator for composite groups of such plants including a swing frame, a handle for said frame, plant abrasion means mounted on and swung by said frame and a chemical feeder carried by and forming a cooperating and co-operative part of said abrasion means whereby said frame and handle may support and propel said means into breaking contact with the plant structure above the roots thereof and thereby inoculate the same with chemical at the instant of contact therewith.

3. A grass trimmer and weed destroyer for composite groups of such plants including a handle, a blade cutter and a chemical applicator, said handle having means at one of its ends to support said blade cutter and said blade cutter in turn supporting said chemical applicator, said chemical applicator having a discharge immediately adjacent the edge of the aforesaid cutter and cooperating simultaneously at the cutter's multiple points of plant contact to apply chemical to cuts made simultaneously in plants of the group.

4. A hand grass trimmer and weed destroyer for grouped plantings, including a handle, an elongated cutter blade on one end of said handle and a weed chemical applicator extending along said blade, said cutter blade of such length as to sever more than one plant in such planting and said weed chemical applicator including a wiper pad holding sufficient weed chemical to simultaneously treat a multiplicity of plants simultaneously contacted by said cutter blade.

References Cited in the file of this patent

UNITED STATES PATENTS

| | | |
|---|---|---|
| 773,743 | Von Hoffmann | Nov. 1, 1904 |
| 845,387 | Wolfgram | Feb. 26, 1907 |
| 1,299,406 | Tyson | Apr. 1, 1919 |
| 1,836,009 | Atkins | Dec. 15, 1931 |
| 1,965,799 | Federspiel | July 10, 1934 |
| 2,687,596 | Rakestraw | Aug. 31, 1954 |
| 2,696,696 | Tigerman | Dec. 14, 1954 |
| 2,740,248 | Pickens | Apr. 3, 1956 |

FOREIGN PATENTS

| | | |
|---|---|---|
| 10,207 | Australia | 1907 |
| 10,197 | Australia | 1913 |
| 23,902 | Australia | 1925 |
| 15,892 | Australia | 1928 |
| 114,164 | Australia | Oct. 29, 1941 |
| 245,331 | Germany | Apr. 1, 1912 |
| 585,009 | Great Britain | Jan. 28, 1947 |